Figure 1:
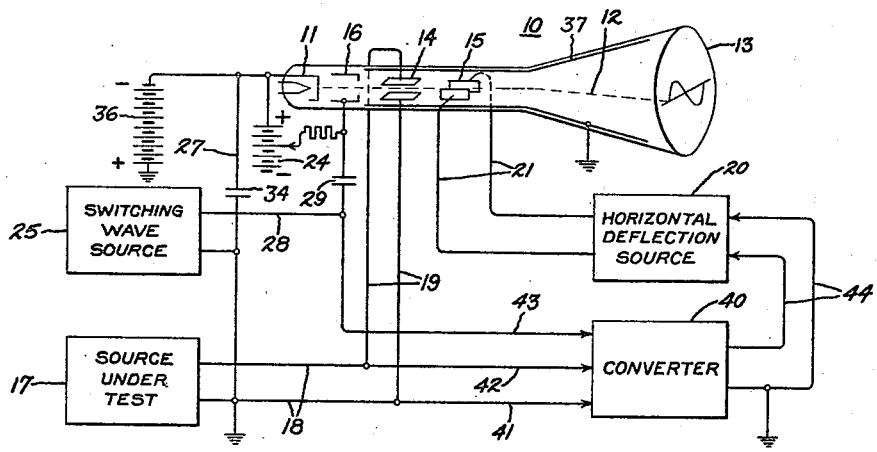

April 21, 1942.  D. E. NORGAARD  2,280,531
OSCILLOGRAPHIC APPARATUS
Filed Nov. 1, 1940

Inventor:
Donald E. Norgaard,
by Harry E. Dunham
His Attorney.

Patented Apr. 21, 1942

2,280,531

UNITED STATES PATENT OFFICE 2,280,531

OSCILLOGRAPH APPARATUS

Donald E. Norgaard, Schenectady, N. Y., assignor to General Electric Company, a corporation of New York Application November 1, 1940, Serial No. 363,883

11 Claims. (Cl. 171—95)

My invention relates to oscillographic apparatus, and particularly to apparatus for analyzing the wave forms of electrical waves. While not limited thereto, my invention finds particular application in the accurate reproduction of the wave forms of high frequency waves.

Cathode ray oscilloscopes or oscillographs of the conventional type require a linear sawtooth sweep wave for undistorted reproduction of the wave form of an unknown wave to be analyzed. Furthermore, the fundamental frequency of the sweep wave must be comparable to the frequency of the unknown wave in order to expand the reproduced wave pattern sufficiently for accurate analysis of a small portion including, at most, a relatively few cycles of the unknown wave. At the present time it is difficult to build an oscillator for generating a linear sawtooth sweep wave having a fundamental frequency in excess of about 100,000 cycles. This seriously limits the study of waves in the higher radio frequency band. For example, with a linear sweep frequency of 100,000 cycles a radio frequency wave of 10 megacycles produces 100 complete cycles on the relatively short horizontal axis of the sensitive screen of the oscillographic apparatus. The wave pattern is thus so compressed along the reference axis that analysis of the wave shape is virtually impossible.

In the stroboscopic analysis of an object rotating at high speed it is well known that the object may be made to appear stationary, or to rotate slowly in one direction or another, if it is illuminated by short periodic flashes of light which recur in proper time relation to the speed of rotation. The application of Siegfried Hansen, Serial No. 363,902, filed concurrently herewith and assigned to the same assignee as the present invention, discloses and claims a method and apparatus wherein an analogous principle is utilized for reducing the apparent frequency of a high frequency wave to a value low enough so that its wave form may be studied in detail with oscillographic apparatus equipped with low frequency sweep circuits.

Briefly, in accordance with the teachings of the aforesaid Hansen application, an unknown high frequency wave to be analyzed and a low frequency sweep wave are applied in the conventional manner to the coordinate deflecting elements of a cathode ray discharge device of known type having a control electrode or grid for controlling the intensity of the cathode ray. A switching wave, composed of short sharp pulses recurring at a frequency which is a linear function of the frequencies of the deflecting wave, is applied to this grid to modulate the intensity of the cathode ray in a predetermined manner. The intensities of certain portions of the pattern traced by the ray are thereby modified to simulate the appearance of a trace of a small portion of the unknown wave on a greatly expanded scale.

As is disclosed more fully in the following specification, the pattern traced by the ray in this type of apparatus may be made to appear stationary providing that the frequencies of the several waves applied to the ray deflecting and grid control elements bear a predetermined relationship to each other. When the frequency of the wave to be analyzed is very high, for example in the short or ultra short wave radio spectrum, it has been difficult, as a practical matter, to produce a standing wave pattern because of small amounts of frequency instability in one or more of the waves applied to the cathode ray device.

In accordance with my invention means are provided, in combination with apparatus embodying the principles disclosed in the aforesaid Hansen application, for synchronizing the several waves applied to the cathode ray device so that a desired fixed relationship between them is maintained even though the frequency of one or more of the waves may vary slightly. Thus, the wave pattern traced by the ray can be made to remain substantially stationary, materially facilitating an analysis of its shape.

It is therefore an object of my invention to provide an improved apparatus for analyzing the wave form of oscillatory electrical waves.

It is a further object of my invention to provide an improved apparatus which has particular utility in the analysis of the form of waves of relatively high frequencies lying in the radio frequency spectrum.

It is also a principal object of my invention to provide an improved oscillographic apparatus whereby the wave form of an oscillatory electrical wave may be reproduced on a large scale as a standing wave pattern to facilitate accurate analysis thereof.

Another object of my invention is to provide an improved oscillographic apparatus, which may utilize a cathode ray device of known form for producing a standing wave pattern and a relatively low frequency linear sweep circuit of conventional design for establishing the horizontal time axis, and which is nevertheless suited to the accurate reproduction of a wave pattern representative of the wave form of a high frequency wave on a linear time axis which is apparently much expanded.

A specific and important object of my invention is to provide an improved oscillographic apparatus of this type wherein the control elements of the cathode ray device are energized from a plurality of wave sources of predetermined high frequencies, with means for maintaining a predetermined fixed relationship between the several frequencies so that a standing wave pattern is maintained even though the absolute values of these frequencies may vary slightly.

In a modified form, my invention further contemplates oscillographic apparatus of this type in which one of the deflecting waves is derived directly from the other waves, so that the predetermined relationship necessary for the production of a standing wave pattern is automatically maintained at all times.

Figure 2:
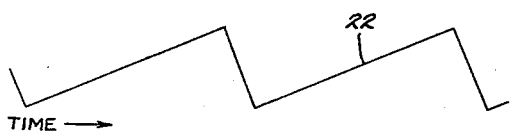
Figure 4:
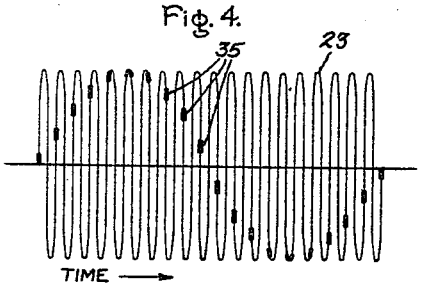
Figure 3:
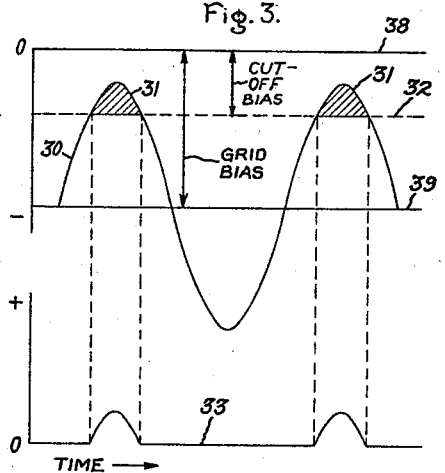

The features of my invention which I believe to be novel are set forth with particularity in the appended claims. My invention itself, however, together with further objects and advantages thereof, may best be understood by reference to the following description taken in connection with the accompanying drawing in which Fig. 1 is a diagrammatic representation of one form of oscillographic apparatus embodying my invention; Figs. 2 and 3 are graphic representations of the forms of certain electrical waves which may be utilized in the apparatus of Fig. 1; and Fig. 4 is a graphic representation of an electrical wave pattern produced by the apparatus of Fig. 1 in accordance with my invention.

The cathode ray discharge device 10 represented in Fig. 1 may take any one of a number of well known forms. A cathode 11 is provided for generating a cathode ray 12 which impinges upon a sensitive screen 13 on the end of the tube envelope. The screen 13 may comprise the usual fluorescent coating for visual observation of the image produced by the ray thereon or a sensitized film for making photographic records. The devices 10 also includes means for deflecting the ray in two mutually perpendicular directions. These are illustrated as the transverse pairs of vertical and horizontal electrostatic deflecting plates 14 and 15, though of course magnetic deflecting coils may optionally be used. A control electrode or grid 16 is also provided for controlling the intensity of the cathode ray 12 in accordance with potentials applied thereto. This in turn controls the intensity of the pattern developed on the sensitive screen 13. A source of high potential 36 connected between cathode 11 and a grounded anode 37 provides the accelerating potential for accelerating the ray toward the screen 13. The cathode ray device 10 may also include the usual elements, not shown, for centering and focusing the ray. The details of the various constructional elements of the cathode ray device 10 are immaterial to my invention and are familiar to those skilled in the art.

In the analysis of waves of relatively high frequencies, it is almost always preferable to use an oscilloscope or oscillograph of the cathode ray type illustrated because of the substantially inertialess control of the cathode ray obtainable. However, where the frequencies of the waves applied to the deflecting and intensity control elements are not too high, the electro-optical type of instrument might be used, wherein a light ray, rather than an electron ray, is utilized and wherein electromechanical elements are utilized for deflecting and modulating the light beam in a manner familiar to those skilled in the art.

An oscillatory wave, whose wave form is to be analyzed, is supplied to one of the pairs of deflecting elements, preferably to the vertical deflecting plates 14. This is indicated schematically in Fig. 1 by the block 17, representative of the source of waves under test, which is connected to the deflecting plates 14 through the conductors 18 and 19.

The horizontal deflecting plates 15 are connected to a horizontal deflection source, represented by the block 20, through the conductors 21. The source 20 generates a sweep wave of a shape and frequency suitable for establishing the horizontal time axis for the wave pattern traced on the screen 13, in the usual manner. Preferably, the wave generated by the source 20 is of substantially linear sawtooth form, such as is indicated graphically by the wave 22 of Fig. 2. Application of the wave 22 to the plates 15 causes the ray to be deflected at a substantially constant time rate in one direction along the horizontal axis and to be returned to its initial position rapidly after a predetermined interval, as is well known. Various sweep oscillator and multi-vibrator circuits known to the art may be utilized to generate a wave of desired fundamental frequency and of the general form of wave 22.

Assume now for the purposes of illustration that the wave applied to the vertical deflecting plates 14 from source 17 is a sinusoidal radio frequency wave and that the sawtooth wave 22 applied to the deflecting plates 15 from the source 20 has a fundamental frequency which is a relatively low, integral submultiple of the frequency of this radio frequency wave. A standing wave pattern will be traced on the sensitive screen 13, of the form generally illustrated by the wave 23 of Fig. 4. A number of complete cycles of the high frequency wave will be represented in the pattern 23. The number of complete cycles will be equal to the ratio of the fundamental frequencies of the respective waves applied to the deflecting plates 14 and 15 so long as the frequency of the wave applied to plates 15 is lower than, or equal to, that of the wave applied to plates 14. As previously mentioned, there are practical difficulties which make it very difficult to design the horizontal deflection source 20 for the production of sawtooth waves having a fundamental frequency higher than of the order of approximately 100,000 cycles. Therefore, if the frequency of the source under test is very high, the many individual cycles of the wave 23 will be so compressed that their true wave form is not readily apparent.

The control grid 16 is biased negatively with respect to the cathode 11 as by a battery 24, for example. It is generally preferable, in the practice of my invention, to make this bias greater than the negative potential required to cut off the beam current. In such case no visible trace of the pattern 23 will be apparent on the screen 13.

A source of switching waves is further provided for increasing the intensity of the cathode ray intermittently and periodically at a predetermined time rate. This source is indicated schematically by the block 25, which is connected to the cathode 11 through a blocking capacitor 34 and conductor 27 and to the grid 16 through a blocking capacitor 29 and conductor 24. This source develops a wave which periodically renders the grid 16 more positive with respect to the cathode 11 than the voltage resulting in cutoff of the beam current.

The precise wave form of the switching wave and the mode of generation thereof are not important to the practice of my invention. For reasons which will shortly become apparent, it is preferably of sinusoidal wave form, such as is illustrated by the curve 30 in Fig. 3. The potential of the cathode 11 is selected as a zero reference level, indicated by the axis 38. The voltage at which the beam current is cut off is represented by the line 32. The grid bias is adjusted so that the sinusoidal variations in grid potential take place about a more negative axis 39 and only the peaks of positive half cycles of wave 30 render the net grid potential less negative than the cutoff value. Thus, as shown in Fig. 3, only the cross-hatched peaks 31 are above the cutoff bias level 32. The resultant variation in beam current, or in screen excitation where a fluorescent screen is used, may be generally illustrated by the wave 33, which consists of short periodic pulses.

Modulation of the intensity of the cathode ray in accordance with the peaks of the switching wave produces a number of visible bright spots 35 in the pattern 23 traced on the sensitive screen 13. The position of these spots in the pattern is dependent upon the frequency of the switching wave relative to the frequencies of the waves applied to the deflecting elements. If the frequency of the switching wave 33 differs from the frequency of the wave to be analyzed by an amount equal to the fundamental frequency of the horizontal deflection wave 22, the bright spots 35 in the pattern 23 will assume the configuration outlined by the heavier portions of the curve 23, for the assumed case of a sinusoidal wave supplied from source 17.

It will be observed from Fig. 4 that the bright spots 35 occur at progressively displaced points on consecutive cycles of the high frequency pattern 23, thus simulating a continuous curve which is representative of a single cycle of the high frequency wave to be analyzed. An easily visible trace is thus obtained of a single cycle of the high frequency wave on a scale which would be obtainable with conventional apparatus only if the frequency of the horizontal deflection source were made equal to that of the wave under test. However, in the apparatus described it is possible to use a relatively low frequency horizontal deflection source and the difficulties inherent in the design of a generator of distortionless high frequency sawtooth waves are obviated.

It will be apparent that the above-described method of producing the discontinuous curve 35 electrically is analogous to the stroboscopic method of analysis of mechanical movements. In the latter case the appearance of the moving object, which is being illuminated by short periodic flashes of light, is dependent upon the relationship between the frequency of the flashes and the recurrence rate of the motion of the object. Similarly, in the present apparatus the appearance of the curve 35 depends upon the frequency relationships between the various electrical waves producing it.

The frequency of the switching wave source 25 must be a linear function of the frequencies of both sources 17 and 20. Analysis will also show that, for a configuration representative of a portion of the pattern 23 to be produced, the bright spots 35 must be progressively displaced along the individual cycles represented by the pattern 23. The spots must be spaced apart by a time interval differing from the time interval of one cycle of the wave under test, or an integral multiple thereof. It can also be shown, as a further condition which must be fulfilled, that the time interval between adjacent spots (i. e., the period of the switching wave) must differ from the time interval of a cycle of the wave under test, or from an integral multiple thereof, by not more than the interval of one-quarter of a cycle of the test wave. If these general requirements are met, the trace of an imaginary curve through the spots 35 will truly simulate a portion of the pattern 23 on an expanded scale.

It is almost invariably desired to have the wave pattern produced by the spots 35 appear stationary on the screen 13. This requires, in addition to the general conditions outlined above, that the frequency of the source 17 must bear an integral relationship to the difference between the frequencies of sources 17 and 25.

For the purposes of simplifying the illustration, both the wave 23 and the spots 35 of Fig. 4 have been represented as stationary. This further requires that the frequencies of sources 17 and 25 be different integral multiples, i. e., different harmonics, of the fundamental frequency of source 20. However, this is not a necessary condition for the pattern simulated by the spots 35 to appear stationary. If these frequencies are not harmonically related, the pattern 23, if visible, and the individual spots 35 will appear to "crawl," but the spots 35 will continue to lie on the same imaginary curve through them. This is actually an advantage since the moving spots blend together and enhance the optical illusion of a smooth curve. Furthermore, there is no need to maintain an exact integral relationship between the high frequency and low frequency sources, which is difficult of practical attainment and an unnecessary refinement unless it is desired to have the high frequency pattern 23 also appear stationary.

The shape and size of each of the luminous spots forming the pattern 35 are determined conjointly by the dimensions of the cathode ray and by the shape of the pulses comprising the switching wave 30. These factors are readily controllable so that the outlines of the pattern 35 may be adjusted for optimum definition, thus facilitating an accurate analysis of the wave shape.

When the bright spots 35 are to be representative of only one cycle, or a few cycles, of a test wave of very high frequency, the switching wave must also be of a high frequency of the same order. It will also be recalled from the foregoing that the fundamental frequency of the horizontal deflection source must be related to the frequency difference between these two high frequencies in a constant integral ratio if a standing wave pattern is to be maintained. Since this latter frequency is a function of the difference of two very high frequencies of nearly equal magnitudes, even a slight instability in the frequency of source 17 or 25 will cause substantial shifting and distortion of the reproduced wave pattern. Instability in the frequency of source 20 may cause some further distortion, though this is generally less serious.

In accordance with my invention, additional means are provided for eliminating the effects of small amounts of frequency instability in the various wave sources so that a standing wave pattern may be maintained on the screen 13 of the device 10 at all times.

Referring again to Fig. 1, it will be observed that the source 17, in addition to being connected to the vertical deflecting plates 14 over the conductors 18 and 19, is also connected to a converter, indicated schematically by the block 40, over the conductors 41 and 42. Similarly, the switching wave source 25, in addition to being connected to the cathode 11 and the grid 16 over conductors 27 and 28, is also connected to the converter 40 over the conductors 42 and 43.

The converter 40 may comprise any one of a number of mixer or heterodyne detector circuits well known to the art. Briefly, in the converter 40 the waves derived from the sources 17 and 25 are combined and a resultant wave having a frequency equal to the difference between their fundamental frequencies is selected for transmission to the output circuit of the converter.

It will be apparent to those skilled in the art that the use of a wave 30 of simple sinusoidal wave form simplifies not only the practical design of the converter circuits, but also the design of the circuits of source 25 for generating this wave. However, it is to be understood that my invention is not limited to the precise wave form illustrated. In the aforementioned copending application of Siegfried Hansen, Serial No. 363,902, an alternative form of the switching wave is disclosed. As is set forth in that application, the individual pulses of the switching wave may be of substantially rectangular shape. Such a wave may be generated by various forms of multi-vibrator circuits known to the art and may alternatively be used in the apparatus embodying my invention, at the expense of additional complication of the circuits of the source 25 and of the converter 40, necessitated by the addition of suitable filtering and wave shaping means.

It is well known that a sweep oscillator or multi-vibrator, such as may be used for the horizontal deflection source 20, may readily be synchronized by the injection of alternating potentials of a related frequency. In accordance with my invention, the output of the converter 40 is supplied to the horizontal deflection source 20 over the conductors 44 to maintain the fundamental frequency of the horizontal deflection source rigidly synchronized with the frequency of the converter output, in a manner familiar to those skilled in the art.

It will be recalled from the foregoing analysis of the operation of the apparatus of Fig. 1 that the frequency of the source 17 must differ from the frequency of the source 25 by an integral multiple of the frequency of the source 20 if a standing wave pattern is produced. Therefore, the frequency of the control wave, supplied from the converter output to the source 20 over the conductors 44, will likewise be equal to an integral multiple of the desired frequency of source 20. Many forms of multi-vibrator or sweep oscillator circuits are known to the art which are readily synchronized by the application of such a control wave having a frequency which is related to the desired sweep frequency in an integral ratio.

It will thus be apparent that I have provided an improved oscillographic apparatus which is ideally suited to the reproduction of the wave forms of high frequency waves on a large scale. Furthermore, in accordance with my invention the wave pattern produced by the bright spots 35, representative of one or more complete cycles of the high frequency wave under test, may be made to appear perfectly stationary. The wave form is readily observed visually or recorded photographically. If the frequency difference between the sources 17 and 25 varies for any reason, the frequency of the output of the converter 40 likewise varies so that the frequency relationships between them remain fixed. As long as these frequency variations are not so great that synchronization cannot be maintained, the frequency of the horizontal deflection source 20 will be proportionately altered and the wave pattern on the screen will remain stationary.

Under certain conditions it may be desirable to modify the apparatus in Fig. 1 slightly to simplify the circuit. Thus, the output wave of the converter 40 may optionally be shaped, by circuits known to the art, to form a sweep wave of predetermined shape and utilized to energize the horizontal deflecting plates 15 directly. In this case, the curve delineated by the spots 35 on the screen 13 will always be representative of the wave form of one, and only one, complete cycle of the high frequency wave under test.

It will then be apparent that I have provided a simple and flexible apparatus for analyzing the form of electrical waves, particularly those of high frequency. While I have shown a particular apparatus embodying my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States, is:

1. In oscillographic apparatus for analyzing electrical waves, the combination of means for developing and projecting a ray, means for deflecting said ray in one direction in accordance with a wave of a first frequency and of predetermined wave form, means for deflecting said ray in another direction in accordance with an oscillatory wave of a second frequency and of an unknown wave form to be analyzed, means for varying the intensity of said ray intermittently and periodically at a third frequency differing from said second frequency by a fourth frequency, said fourth frequency being normally related to said first frequency in an integral ratio, and means responsive to any variations in said fourth frequency for correspondingly varying said first frequency to maintain said ratio constant.

2. The combination, in apparatus for analyzing electrical waves of a cathode ray discharge device having means therein for developing and projecting a cathode ray against a sensitive surface, means for deflecting said ray in one plane in accordance with a first wave of predetermined wave form and of a first relatively low frequency, means for deflecting said ray in a transverse plane in accordance with a second high frequency wave of unknown form to be analyzed, whereby a predetermined wave pattern is traced on said surface, means for modulating the intensity of said ray periodically at a third high frequency, said high frequencies normally differing from each other by a fourth frequency related to said first frequency in an integral ratio, whereby the intensity of portions of said pattern is altered in a predetermined stationary configuration, and means substantially to prevent distortion of said configuration due to undesired variations in certain of said frequencies comprising means responsive to variations in said fourth frequency for correspondingly varying said first frequency to maintain said ratio constant.

3. In combination with a cathode ray discharge device having means therein for developing and projecting a cathode ray against a sensitive screen, a pair of coordinate ray deflecting elements and a control grid, of a first source of switching waves of predetermined wave form and of a first frequency, a second source of waves of a second, different frequency and of an unknown wave form to be analyzed, a third source of sweep waves of predetermined wave form and of a third frequency, said third frequency being normally related to the difference frequency between said first and second frequencies in an integral ratio, said ratio being subject to undesired fluctuations due to frequency instability in certain of said sources, means energizing said control grid from said first source, means energizing said deflecting elements from said second and third sources respectively, whereby said ray is modulated and deflected to trace a predetermined pattern on said screen which is subject to distortion upon fluctuation in said ratio, and means for substantially eliminating said distortion comprising means responsive to said difference frequency for varying the frequency of said third source so as to maintain said ratio substantially constant.

4. Apparatus for analyzing the wave forms of electrical waves comprising, in combination, a cathode ray device having means therein for projecting a ray against a screen, a control grid and a pair of deflecting elements, a sweep wave source of relatively low fundamental frequency coupled to one of said elements, a high frequency wave source to be analyzed coupled to the other of said elements, a switching wave source coupled to said grid for controlling the intensity of said ray, said switching wave comprising short pulses recurring at a second high frequency which differs from said first high frequency by a frequency normally bearing an integral ratio to said low frequency, whereby the intensities of portions of said pattern are altered in a predetermined stationary configuration, said configuration being subject to distortion upon variation in said ratio due to frequency instability in certain of said sources, means for heterodyning said high frequency waves and for selecting a control wave of their difference frequency, and means for substantially eliminating said distortion comprising means for synchronizing said sweep source with said control wave.

5. In oscillographic apparatus for analyzing electrical waves, the combination of means for developing and projecting a ray, means for deflecting said ray in one direction in accordance with a wave of a first frequency and of predetermined wave form, means for deflecting said ray in another direction in accordance with an oscillatory wave of a second frequency and of an unknown wave form to be analyzed, means for varying the intensity of said ray intermittently and periodically at a third frequency, said third frequency differing from said second frequency by a fourth frequency which is normally related to said first frequency in an integral ratio, means for combining the waves of said second and third frequencies and for selecting waves of said fourth frequency, and means for synchronizing said first-mentioned deflecting means with the waves of said fourth frequency, thereby to prevent any variation in said ratio.

6. In oscillographic apparatus for analyzing electrical waves, means for developing and projecting a ray, means for deflecting said ray in one direction in accordance with a first wave of high frequency and of unknown wave form to be analyzed, means for modulating the intensity of said ray in accordance with a wave of a second high frequency, means for combining said high frequency waves and for selecting a control wave of their difference frequency, and means for deflecting said ray in another direction in accordance with a wave synchronized with said control wave.

7. In combination with a cathode ray device having ray developing and projecting means, ray intensity control means and a pair of coordinate ray deflecting means, a source of oscillatory waves of a high frequency and of a wave form to be analyzed coupled to one of said deflecting means, a generator of waves of a second high frequency and of predetermined wave form coupled to said intensity control means, a generator of waves of a relatively low frequency and of predetermined wave form coupled to the other of said deflecting means, said high frequencies normally differing from each other by a frequency which bears an integral ratio to said low frequency, said ratio being subject to undesired variations due to frequency instability in certain of said sources, a converter coupled to said high frequency sources for combining said high frequency waves and for transmitting a control wave of their difference frequency, and means for coupling said control wave to said low frequency generator to synchronize said low frequency wave with said control wave.

8. In combination with a cathode ray device having ray developing and projecting elements, a control grid and a pair of coordinate ray deflecting elements, a source of oscillatory waves of a first high frequency and of a wave form to be analyzed coupled to one of said deflecting elements, a generator of substantially sinusoidal waves of a second high frequency, means for supplying said second waves to said grid, means for supplying a negative bias to said grid greater than the peak value of said second waves such that the potential of said grid is rendered less negative than the beam current cut-off value only on positive peaks of said second waves, a generator of substantially sawtooth waves coupled to the other of said deflecting elements, said sawtooth waves being of a relatively low fundamental frequency which is normally integrally related to the difference frequency between said high frequencies, a converter coupled to said high frequency source and high frequency generator for deriving a control wave therefrom of their difference frequency, and means for synchronizing said sawtooth wave generator from said control wave.

9. In combination with a cathode ray discharge device having ray developing and projecting means, a control grid and a pair of deflecting means, means supplying high frequency waves to be analyzed to one of said deflecting means, means supplying high frequency waves of a different frequency to said control grid, means for combining said high frequency waves and for selecting a wave of their difference frequency, and means supplying said last-mentioned wave to the other of said deflecting means.

10. In apparatus for analyzing the wave forms of eletcrical waves, the combination with a cathode ray device including elements for developing and projecting a ray against a surface, a ray intensity control element and a pair of coordinate ray deflecting elements, of means for supplying high frequency waves to be analyzed to one of said deflecting elements, a source of sweep waves of a relatively low frequency coupled to the other of said deflecting elements, whereby said ray is caused to trace a predetermined pattern on said surface representative of a plurality of successive cycles of said first wave, a source of switching waves of a high frequency coupled to said control element, said high frequencies normally differing from each other by a difference frequency which causes the intensity of said pattern to be altered at points progressively displaced along the successive cycles of said pattern, said difference frequency also normally bearing an integral ratio to said low frequency, whereby said points normally form a stationary configuration, said configuration being subject to distortion due to undesired frequency shifts in certain of said waves, means for heterodyning said high frequency waves and for selecting a control wave of said difference frequency, and means for eliminating said distortion comprising means for synchronizing said sweep wave source with said control wave.

11. In apparatus for analyzing the wave forms of electrical waves, the combination with a cathode ray device including elements for developing and projecting a ray against a surface, a ray intensity control element and a pair of coordinate ray deflecting elements, of means for supplying high frequency waves to be analyzed to one of said deflecting elements, a source of sweep waves of a relatively low frequency coupled to the other of said deflecting elements, whereby said ray is caused to trace a predetermined pattern on said surface representative of a plurality of successive cycles of said first wave, a source of switching waves of a high frequency coupled to said control element, said switching waves having a period differing from the period of said first-mentioned waves, or differing from an integral multiple thereof, by not more than the time interval of one-quarter of a cycle of said first-mentioned waves, the difference frequency between said high frequencies normally bearing an integral ratio to said low frequency, whereby the intensity of said pattern is altered to produce a plurality of points normally forming a predetermined stationary configuration, said configuration being subject to distortion due to undesired frequency shifts in certain of said waves, means for heterodyning said high frequency waves and for selecting a control wave of said difference frequency, and means for eliminating said distortion comprising means for synchronizing said sweep wave source with said control wave.

DONALD E. NORGAARD.